UNITED STATES PATENT OFFICE.

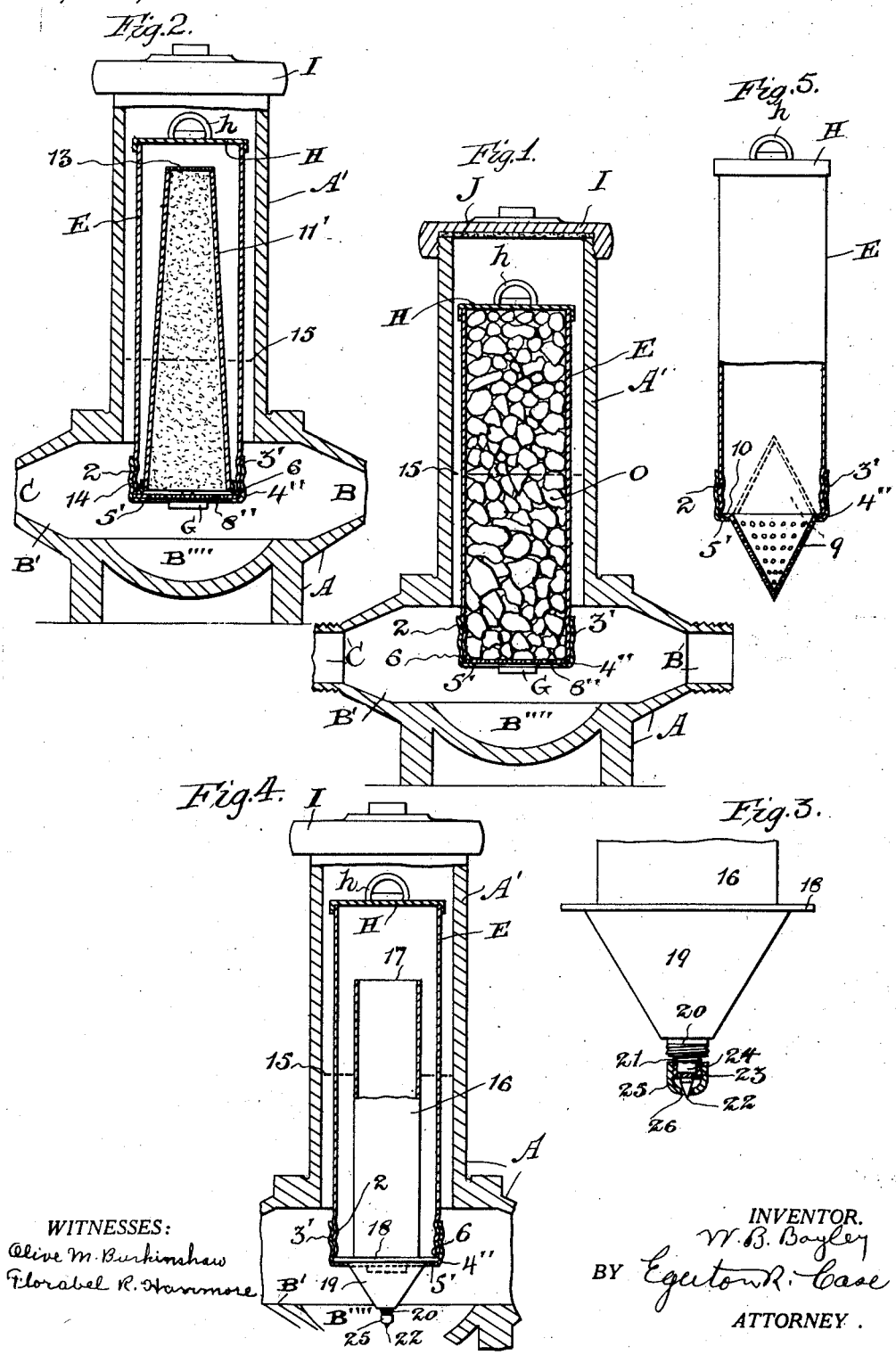

WILLIAM BRAYBROOKE BAYLEY, OF TORONTO, ONTARIO, CANADA.

FERTILIZER-DISTRIBUTER.

1,216,051.     Specification of Letters Patent.     Patented Feb. 13, 1917.

Application filed June 27, 1914. Serial No. 847,744.

*To all whom it may concern:*

Be it known that I, WILLIAM BRAYBROOKE BAYLEY, a subject of the King of Great Britain, of the city of Toronto, county of York, Province of Ontario, Canada, have invented certain new and useful Improvements in Fertilizer-Distributers, of which the following is a specification.

My invention relates to improvements in fertilizer distributers, and the principal objects of my invention are, firstly, to provide a positive supply of air within the apparatus so as to provide a positive bar to the water rising an undue height in the fertilizer receptacle; secondly, to provide an adjustable means to regulate the supply of material, held within the apparatus, to the water passing therethrough; thirdly, to positively regulate the strength of the solution resulting from the admixture of the materials within the apparatus and the water passing therethrough; fourthly, to provide positive means whereby fertilizers, such as ground bone and concentrated animal blood, may be positively fed to the water notwithstanding the tendency of the same to swell when moistened; and fifthly, to provide a positive mixing chamber in my apparatus so as to cause the dissolved or partly dissolved materials to be thoroughly mixed with the water as it passes from the mixing chamber. Various minor objects of my invention will appear in the following specification wherein I shall describe the construction of my invention and the various parts thereof.

Figures 1 and 2 are vertical central sections through my apparatus, showing the same fitted for various uses. Fig. 3 is a side elevation of the lower portion of the receptacle designed to contain a liquid fertilizer; disinfectant, or insecticide, showing in vertical section the control for the outlet thereof. Fig. 4 is a vertical central section through the major portion of my apparatus showing in side elevation the lower portion of the receptacle illustrated in Fig. 3, mounted therein, and Fig. 5 is a vertical central section through the lower portion of one form of fertilizer receptacle, showing a modified form of an adjustable regulator therefor.

In the drawings, like characters of reference indicate corresponding parts in each figure.

As will be understood from the following specification, the material to be distributed by the apparatus will be fed down into the mixing chamber chiefly by gravity, though no doubt, with certain classes of material, the air pressure within the apparatus will assist gravity for the purpose stated.

By providing regulators of different mesh for the bottom of certain types of fertilizer receptacles, and of different shapes, I can positively control the supply of material, and overcome the varying degrees of solubility of the fertilizers, by providing what I term as weak, medium, and strong attacks, of the water, on the material contained within certain fertilizer receptacles.

Florists and others are well aware of the fact that in distributing various kinds of fertilizers, great care must be taken that the water charged with the fertilizer shall not contain too much of this fertilizer as this would result in serious injury to plants, flowers, and foliage. The construction of my apparatus hereinafter set forth provides means whereby all variations in solubility and size of grain of soluble, insoluble, or partly soluble, fertilizers, shall be overcome so that the resulting solution shall only contain the desired percentage of the fertilizer. From the foregoing it follows that my apparatus can be adjusted to hasten or retard the dissolution of the fertilizing material according as the user may require.

In order to make my apparatus operative, I must retain within the same, the same water pressure as is present in the water conduit leading thereto, otherwise it would be impossible to keep the proper continuous supply of the fertilizer or other material to the water.

A is the apparatus which comprises an upper chamber A' and a mixing chamber B'. This mixing chamber is provided with ingress and egress openings B and C, to which is designed to be secured any suitable conduits or piping, not shown. As before set forth, it is necessary for me to secure the same water pressure in the chambers A' and B' as is persent in the conduit (not shown) coupled to the ingress opening B. Now in order to secure this pressure, that section of the said conduit or piping (not shown) which is designed to be coupled to the egress opening C will in effect throttle the said egress opening so as to cause the rise of the water in the upper chamber A'. Now when I maintain the required water pressure within the said chambers, water rises the required height within the fertilizer receptacle E with the result that the material contained therein is gradually dissolved, but owing to the air cushion already set forth, the height of the water in certain forms of fertilizer receptacles, is restrained from rising too high.

The mixing chamber B' is depressed or provided with a basin B'''' immediately underneath the various forms of fertilizer receptacles. The lower ends of the fertilizer receptacles, extend well into the mixing chamber B', so that the water passing therethrough is caused to eddy or swirl around. This movement is continued down into the basin B'''' with the result that this commotion thoroughly mixes the material passing into the mixing chamber B' with the water in said mixing chamber before it escapes from the egress opening C.

The upper-outer edge of the upper chamber is threaded so as to permit a cap I to be screwed to close the top of said member. A gasket J is provided to make the cap I air tight.

In the casing A, I form a pair of lugs G (one only of which is shown) integrally with the chamber B'''. In Figs. 1 and 2 the said lugs are shown as supporting the receptacle E at its lower end.

The receptacle E is sealed by a permanently closed top H, which is fixedly secured to the receptacle E, as shown, or integrally formed therewith. The ring h or other means may be attached to the top H to provide a handle for this receptacle.

The bottom of the receptacle E is preferably provided with threads 2 over which screws the threaded flange 3' of the retaining cap 4'' which is provided with a horizontal flange 5' which overlaps the lower edge 6 of the said receptacle E. The bottom of this receptacle is illustrated in Figs. 1 and 2 as composed of a perforated disk 8''. This disk 8'' is clamped between the lower edge 6 of the receptacle E and the flange 5' of the retaining cap 4''. In order to fill the receptacle E, the same is removed from the chamber A'', and then the cap 4'' and disk 8'' are removed. Any suitable material, such as sodium nitrate O, is placed within the receptacle E, and then the disk 8'' and cap 4'' are replaced. The receptacle E is then placed in the position shown in Figs. 1 and 2 and the cap I screwed down tightly. Water is then caused to pass into and through the chamber B'. By means of the perforated disk 8'', the water has access to the sodium nitrate which it dissolves sufficiently to permit the same to pass through the perforations of the disk 8'' and into the water swirling through the chamber B'. As a considerable amount of air is imprisoned within the receptacle E, this imprisoned air acts as a buffer to prevent the water rising too high within this receptacle and dissolving too much of the sodium nitrate or other fertilizer. The air cushion within the said receptacle not only prevents the water from rising too high therein, but it also to a certain degree assists in the feeding of the sodium nitrate to the bottom thereof, though this feeding of the said material is chiefly provided for by gravity.

Since air positively can not escape out of the receptacle E, it will be understood that although should the cap I not be screwed down tightly, the air pressure within the receptacle E will prevent the water from rising too high within said receptacle, though a lack of air pressure within the chamber A'' may permit the water to even fill this chamber.

It will of course be understood that perforated disks having holes of various sizes may be used in place of the perforated disks 8' and 8''.

In place of the perforated disks described, which I term regulators, I may use a regulator in the form of a perforated cone 9. With this type of regulator I may provide a weak or strong attack for the water. By placing the cone regulator 9 in the dotted position illustrated in Fig. 5 I provide for a weak attack of the water, and by placing the cone regulator in the position illustrated in full lines in this figure, I provide for a strong attack of the water.

The cone regulator 9 is provided with a flange 10 which is clamped between the lower edge 6 of the receptacle E and the flange 5' of the retaining cap 4''.

To adapt the apparatus illustrated in Figs. 1 and 2 for the distribution of fertilizers such as ground bone, I position within the receptacle E (see Fig. 2) the fertilizer receptacle 11' in the form of a truncated cone. As this fertilizer receptacle 11' will have to be filled before it is placed within the receptacle E, I close the top of the same by a perforated disk or other equivalent member 13. The member 13 prevents the material placed within the receptacle 11' from falling thereoutof, when the same is inverted when being filled; but when this receptacle is positioned for use the perforations in the said member permit the air to pass from the receptacle E into the said fertilizer receptacle. I utilize any suitable means to retain the receptacle 11' in place. I prefer to provide the lower end of the receptacle 11' with ears 14 which are clamped between the perforated disk 8'' and the edge 6 of the receptacle E by the horizontal flange 5' of the retaining cap 4''. The bottom proper of the receptacle 11' is open, and the same is closed when in the position illustrated in Fig. 2, by means of the perforated disk 8'' or its equivalent. The parts described permit the receptacle 11' to be readily removed from the receptacle E and also permit the various regulators to be used with the said receptacle 11' as required.

In the use of my invention illustrated in Fig. 2, the receptacle E now performs the different and double function of a container for the receptacle 11', and as means whereby an additional amount of air may be had to most effectively prevent the water rising too high within the receptacle 11'.

The water is presumed to normally rise approximately to the position indicated by the dotted lines 15 in certain of the various figures. Of course should the closing cap or caps for the upper chamber of the apparatus permit air to escape therefrom, the water level no doubt would rise higher than indicated. Should the cap I in the forms of my invention illustrated in Figs. 1, 2 and 4 permit the escape of all the air in the chamber A'' and the chamber A'' become filled with water, by reason of the construction of the receptacle E, the required air pressure within said receptacle will always be had for the purpose set forth.

In Fig. 4 I illustrate my apparatus as adapted to be used for the distribution of a liquid fertilizer. The liquid fertilizer is placed within the receptacle 16, the top 17 of which is open to the air pressure within the receptacle E. The receptacle 16 is provided near its lower end with an annular flange 18, which is loosely held between the lower edge 6 of the receptacle E and the horizontal flange 5' of the retaining cap 4''. There is a loose fit between the edge of the annular flange 18 and the threaded flange 3'; and as the flange 18 is loosely held in place as before set forth, it will be understood that a passageway is provided for the entry of water into the lower portion of the receptacle E. The bottom of the receptacle 16 is conical shape as shown at 19, and controlling the escape of liquid fertilizer therefrom is any suitable means. For instance, I may use the following well known controlling means. 20 is a centrally pierced plug mounted in the lower end of the bottom 19. The lower portion 21 of this plug is externally threaded, and terminates in a conically shaped stud 22. 23 are a plurality of holes leading from the passage way 24 of the plug 20. 25 is a cap having a tapered opening 26 surrounding the stud 22. The liquid material escapes between the stud 22 and sides of the opening 26 into the mixing chamber B'''. Since the cap 25 is threaded to co-act with the threaded lower portion 21 of the plug 20, the supply of liquid fertilizer from the receptacle 16 can be regulated.

Since the top 17 of the receptacle 16 is open, the air within the receptacle E will always be acting upon the liquid within said receptacle.

I may use my apparatus for the purpose of distributing suitable material into and through the flues of boilers for the purpose of cleaning the same, and I have shown the walls of the chambers A' and B' constructed particularly strong for this purpose.

The removable parts of my apparatus can be readily replaced at slight cost in case of breakage, and as natural laws are made use of in the working of the apparatus, I have provided an apparatus of the class set forth substantially automatic in its action, possessing the advantages already enumerated.

While I have described what I consider to be the best embodiment of my invention, I desire it to be understood that the principle can be embodied in different forms and I desire not to be limited beyond the requirements of the prior art and the terms of my claims.

What I claim as my invention is:

1. An apparatus of the class described comprising a receptacle composed of an upper chamber freely communicating with a mixing chamber therebelow, said mixing chamber provided below said upper chamber with a mixing basin, and being further provided with ingress and egress openings, removable means for closing the top of said upper chamber; a fertilizer receptacle having imperforate walls supported within said upper chamber and spaced apart therefrom so as to form an air chamber in said upper chamber, air-tight above the level to which water rises therein to allow for the production of an air-cushion in said upper chamber, and having a permanently sealed upper end to permit the receptacle to retain air to form an auxiliary air-cushion, and an open lower end, which lower end extends down into said mixing chamber, and a perforated regulator removably supported over the lower end of said fertilizer receptacle.

2. An apparatus of the class described comprising a receptacle composed of an upper chamber freely communicating with a mixing chamber therebelow, said mixing chamber provided below said upper chamber with a mixing basin, and further provided with ingress and egress openings; removable means for closing the top of said upper chamber; a fertilizer receptacle having imperforate walls supported within said upper chamber and spaced apart therefrom so as to form an air chamber within said upper chamber, air-tight above the level to which water rises therein to allow for the production of an air-cushion, and having a permanently sealed upper end, to permit the receptacle to retain air to form an auxiliary air-cushion, and an open threaded lower end, which lower end extends down into said mixing chamber; a perforated regulator for the lower end of said fertilizer receptacle; a retaining cap provided with a threaded flange designed to engage with the threaded lower end of said receptacle, and further provided with a horizontal flange which clamps said perforated regulator in place.

3. An apparatus of the class described comprising a receptacle composed of an upper chamber freely communicating with a mixing chamber therebelow, said mixing chamber provided below said upper chamber with a mixing basin, and further provided with ingress and egress openings; removable means for closing the top of said upper chamber; a receptacle having imperforate walls supported within said upper chamber and spaced apart therefrom so as to form an air chamber in said chamber, air-tight above the level to which water rises therein to allow for the production of an air-cushion in said upper chamber, and having a permanently sealed upper end, to permit the receptacle to retain air to form an auxiliary air-cushion, and an open lower end which lower end extends down into said mixing chamber; a fertilizer receptacle mounted within said first receptacle and provided with an open upper end, and means controlling the escape of fertilizer through the lower end of said receptacle.

4. An apparatus of the class described comprising a receptacle composed of an upper chamber freely communicating with a mixing chamber therebelow, said mixing chamber provided below said upper chamber with a mixing basin, and further provided with ingress and egress openings, a receptacle having imperforate walls supported within said upper chamber, and spaced apart therefrom so as to form an air chamber in said upper chamber, air-tight above the level to which water rises therein to allow for the production of an air cushion in said upper chamber, and having a permanently sealed upper end, to permit the receptacle to retain air to form an auxiliary air-cushion, and an open lower end, which lower end extends down into said mixing chamber; a fertilizer receptacle in the form of a truncated cone mounted within said first receptacle and provided, to cover its upper smaller end, with a perforated member secured thereto; means carried by the lower end of said fertilizer receptacle designed to engage against the lower edge of said first receptacle; a perforated regulator for the lower end of said fertilizer receptacle, and means whereby said perforated regulator and said fertilizer receptacle are held in position.

In testimony whereof I have affixed my signature in presence of two witnesses.

WILLIAM BRAYBROOKE BAYLEY.

Witnesses:
EGERTON R. CASE,
O. M. BURKINSHAW.